3,538,095
BROMINE-CONTAINING PIGMENT DYES OF THE PERINONE SERIES

Otto Christmann and Herbert Naarmann, Ludwigshafen (Rhine), Germany, assignors to Badische Anilin- & Soda-Fabrik Aktiengesellschaft, Ludwigshafen (Rhine), Germany
No Drawing. Filed Apr. 23, 1968, Ser. No. 723,563
Claims priority, application Germany, Apr. 25, 1967, 1,569,669
Int. Cl. C07d 51/48
U.S. Cl. 260—251                                        2 Claims

ABSTRACT OF THE DISCLOSURE

Perinone dyes of the formula

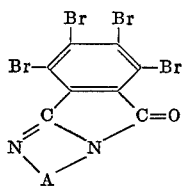

wherein A represents a member from the group consisting of

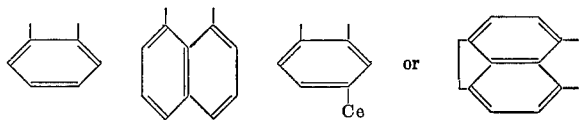

are useful as flame retardant dyes in the mass coloration of styrene polymers.

---

It is known that good fastness properties, such as good stability to high temperatures, are required of pigment dyes which are to be used for the mass coloration of plastics. In many cases, particularly in the coloring of styrene polymers, it is moreover desirable that the dyes used should increase the flame retardency of the material to be dyed. Since there is a pronounced lack of yellow to red organic pigment dyes which are distinguished by the said properties there exists the problem of synthesizing pigment dyes which fulfill the requirements to a high degree.

This invention relates to new yellow to red pigment dyes of the perinone series which have the desired properties. These new dyes have the general formula:

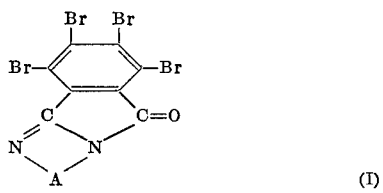

in which A denotes one of the radicals:

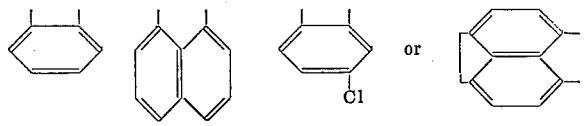

The new dyes may be prepared by reacting tetrabromophthalic acid or a derivative of this acid by a conventional method with a diamine having the general formula:

in which A has the above meanings.

Examples of diamines having the Formula II are: orthophenylenediamine, 1,8-diaminonaphthalene, 1-chloro-3,4-diaminobenzene or 5,6-diaminoacenaphthene.

Derivatives of tetrabromophthalic acid may be used instead of the free acid; examples are acid halides, esters or the anhydride.

The reaction for the preparation of the new dyes may be carried out for example by heating tetrabromophthalic acid or the anhydride of this acid with a diamine at a temperature of from 50° to 200° C. Condensation thus takes place with the formation of the perinone. This condensation is in general carried out in the presence of solvents, such as acetic acid, or aromatic compounds, such as dichlorobenzene, trichlorobenzene and nitrobenzene.

The new perinone dyes are valuable pigments having very good fastness properties. They are outstanding suitable for mass-coloring natural or synthetic macromolecular substances, such as polypropylene, polyethylene, polyamides, polyesters, phenoplasts, aminoplasts and rubber and particularly for coloring styrene polymers. Examples of styrene polymers are bulk polymers, solution polymers and/or suspension polymers of styrene, copolymers of styrene with acrylonitrile, methacrylonitrile, n-butyl acrylate, methyl methacrylate, α-methylstyrene and/or ortho-isopropylstyrene, the amount of comonomers in the copolymers being from about 0.1 to 50% by weight. Coloring the said substances is carried out by known methods, about 0.05 to 5 parts by weight of dye (with reference to 100 parts by weight of the substance to be colored) being used.

The particular advantage of the dyes obtainable according to the invention over the prior art dyes of the perinone series, such as are described for example in German patent specification No. 955,268, resides in the fact that they have a remarkable flame-retardant action. The plastics to be dyed, such as polystyrene or styrene polymers, which may have a content of 10% by weight of rubber, and the polymers known as ABC-polymers may thus be made flameproof with the new dyes.

The invention is illustrated by the following example. The parts and percentages specified in the examples are parts and percentages by weight.

EXAMPLE 1

158 parts of 1,8-diaminonaphthalene and 464 parts of tetrabromophthalic anhydride are heated in 3000 parts of glacial acetic acid for five hours at refluxing temperature. The red pigment dye is suction filtered cold, washed with water until neutral and then dried. The yield of tetrabromophthaloperinone is 577 parts of 98.5% of the theory.

Dyeing with the said dye may be carried out for example in the following way:

(a) 1000 parts of a 10% solution of polystyrene having a K value of 76 (measured according to H. Fikentscher, Cellulosechemie, vol. 13 (1932) page 60) is mixed with 5 parts of the dye.

The solvent is removed at 80° C. Pressmolded boards having the dimensions 10 cm. x 10 cm. and a thickness of 2 mm. are prepared from the colored polystyrene material free from solvent. When these pressmolded boards are held for five seconds in a luminous bunsen flame 3 cm. in length and then withdrawn, the flame becomes extinguished after one second. When a board pressmolded from polystyrene is treated under the same conditions, the board burns.

(b) 100 parts of polystyrene having a K value of 76 is mixed in a kneader with 5 parts of the dye for thirty minutes at 190° C. When a pressmolded board having the dimensions given in a section (a) prepared from the mixture is subjected to the text described in section (a), the flame also becomes extinguished.

EXAMPLE 2

108 parts of ortho-phenylenediamine and 464 parts of tetrabromophthalic anhydride is heated under reflux in 2500 parts of glacial acetic acid for five hours. The product is worked up as in Example 1; the yield is 506 parts (95% of the theory) of a greenish yellow pigment.

When colored polystyrene boards are prepared with this dye by the method described in sections (a) and (b) of Example 1, they are extinguished under the test conditions specified in Example 1.

We claim:
1. A dye having the general formula:

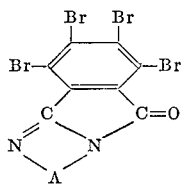

in which A denotes one of the radicals:

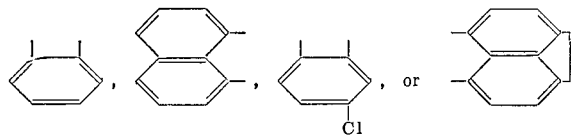

2. The dye having the formula:

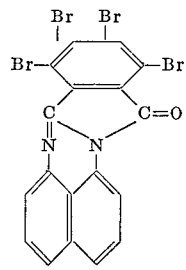

References Cited

UNITED STATES PATENTS 2,889,327  6/1959  Howard et al. _____ 260—251

FOREIGN PATENTS 730,692  5/1955  Great Britain.
1,075,110  10/1054  France.

OTHER REFERENCES

Sacks: C. A. 3, 1872.[3]

ALEX MAZEL, Primary Examiner
R. V. RUSH, Assistant Examiner

U.S. Cl. X.R.

252—8.1; 260—41, 309.2, 458